United States Patent
Xu

(10) Patent No.: US 12,306,386 B2
(45) Date of Patent: May 20, 2025

(54) OPTICAL LENS, CAMERA MODULE AND IMAGE CAPTURING DEVICE

(71) Applicant: GUANGDONG OPPO MOBILE TELECOMMUNICATIONS CORP., LTD., Guangdong (CN)

(72) Inventor: Qing Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 629 days.

(21) Appl. No.: 17/591,403

(22) Filed: Feb. 2, 2022

(65) Prior Publication Data

US 2022/0155565 A1    May 19, 2022

Related U.S. Application Data

(63) Continuation of application No. PCT/CN2020/107184, filed on Aug. 5, 2020.

(30) Foreign Application Priority Data

Aug. 5, 2019  (CN) .......................... 201910718291.0

(51) Int. Cl.
G02B 13/00     (2006.01)
G02B 7/02      (2021.01)

(52) U.S. Cl.
CPC ......... *G02B 13/0065* (2013.01); *G02B 7/021* (2013.01)

(58) Field of Classification Search
CPC .......................... G02B 13/0065; G02B 7/021
USPC .......................................................... 359/819
See application file for complete search history.

(56) References Cited

U.S. PATENT DOCUMENTS

| 3,970,366 A | 7/1976 | Sekiguchi | |
| 7,508,595 B2* | 3/2009 | Kojima | G02B 15/145129 |
| | | | 359/687 |
| 2003/0161620 A1* | 8/2003 | Hagimori | G02B 15/144113 |
| | | | 396/72 |
| 2004/0105020 A1* | 6/2004 | Iwasawa | G02B 13/006 |
| | | | 359/676 |

(Continued)

FOREIGN PATENT DOCUMENTS

| CN | 101071196 | 11/2007 |
| CN | 102004303 | 4/2011 |

(Continued)

OTHER PUBLICATIONS

EPO, Extended European Search Report for EP Application No. 20849919.4, Aug. 16, 2022.

(Continued)

*Primary Examiner* — Sharrief I Broome
(74) *Attorney, Agent, or Firm* — Hodgson Russ LLP

(57) ABSTRACT

An optical lens optical lens includes a prism, a first lens group, a second lens group, and a third lens group arranged from the object image to the image side. A first diaphragm is between the first lens group and the prism. A second diaphragm is between the second lens group and the third lens group or the first lens group. In the long-focus state, the first diaphragm is an aperture diaphragm, and the second diaphragm is a flare eliminating diaphragm. In the short-focus state, the second diaphragm is an aperture diaphragm, and the first diaphragm is a flare eliminating diaphragm.

19 Claims, 7 Drawing Sheets

(56) References Cited

U.S. PATENT DOCUMENTS

2006/0044423 A1* 3/2006 Hagimori ....... G02B 15/144113
  348/240.3
2008/0198451 A1 8/2008 Gohman et al.
2016/0327773 A1 11/2016 Choi et al.

FOREIGN PATENT DOCUMENTS

| CN | 102338926 | 2/2012 |
| CN | 102902045 | 1/2013 |
| CN | 103631017 | 3/2014 |
| CN | 204241744 | 4/2015 |
| CN | 105068228 | 11/2015 |
| CN | 106249392 | 12/2016 |
| CN | 205982949 | 2/2017 |
| CN | 208937799 | 6/2019 |
| JP | 2004295075 | 10/2004 |
| JP | 2004348082 | 12/2004 |
| JP | 2007093984 | 4/2007 |
| JP | 2010060919 | 3/2010 |
| JP | 2014109664 | 6/2014 |
| JP | 2016090840 | 5/2016 |
| JP | 2018092023 | 6/2018 |

OTHER PUBLICATIONS

WIPO, International Search Report and Written Opinion for PCT/CN2020/107184, Oct. 28, 2020.
CNIPA, First Office Action for CN Application No. 201910718291.0, Jul. 5, 2021.

* cited by examiner

OPTICAL LENS, CAMERA MODULE AND IMAGE CAPTURING DEVICE

CROSS REFERENCE TO RELATED APPLICATIONS

The present disclosure is a continuation of International Patent Application No. PCT/CN2020/107184, filed on Aug. 5, 2020, which claims priority to Chinese Patent Application No. 201910718291.0, filed Aug. 5, 2019, the entire disclosures of which are incorporated herein by reference.

TECHNICAL FIELD

The present disclosure relates to the field of consuming electronics, and in particular to an optical lens, a camera module, and an image capturing device.

BACKGROUND

A lens is typically configured with a single diaphragm. While a physical size of the diaphragm remains unchanged, the diaphragm is moved together with a zoom lens group or a compensation lens group to match various sizes of a pupil aperture at various focal lengths. Since optimization can be performed only to allow various physical sizes of the diaphragm to be similar at various focal lengths, it is unable to ensure the various physical sizes of the diaphragm to be identical at various focal lengths. In this way, stray light or vignetting may be brought to an actual lens.

SUMMARY OF THE DISCLOSURE

The present disclosure provides an optical lens, including: a prism, a first lens group, a second lens group, and a third lens group, that are successively arranged along a direction from an object side to an imaging side. The prism is fixed relative to an imaging surface of the optical lens. A first diaphragm is disposed between the first lens group and the prism. A second diaphragm is disposed between the second lens group and the third lens group or between the first lens group and the second lens group. When the optical lens is switched between a short focal length state and a long focal length state, the prism is fixed, the first lens group and the first diaphragm are fixed relative to the prism, and the second lens group, the third lens group and the second diaphragm move along an optical axis of the optical lens relative to the prism, such that in the long focal length state, the first diaphragm serves as an aperture diaphragm and the second diaphragm serves as a stray light elimination diaphragm; and in the short focal length state, the second diaphragm serves the aperture diaphragm, and the first diaphragm serves as the stray light elimination diaphragm.

The present disclosure further provides a camera module including the optical lens according to any one of the above embodiments and a light sensitive element disposed on the imaging side of the optical lens. The light sensitive element is configured receive a light signal passing through the optical lens and to convert the light signal into an electrical signal.

The present disclosure further provides an image capturing device, including the camera module according to any one of the above embodiments and a device shell. The camera module is arranged on the device shell.

BRIEF DESCRIPTION OF THE DRAWINGS

The above and/or additional aspects and advantages of the present disclosure will become apparent and easily understood from the description of the embodiments by referring to the following accompanying drawings.

DETAILED DESCRIPTION

Figure 1:
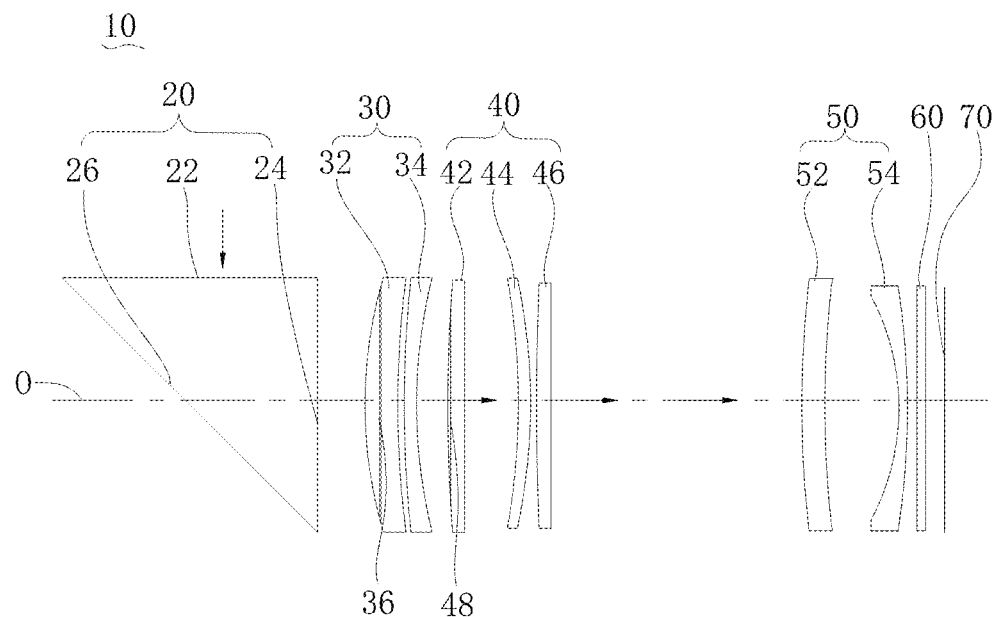
FIG. 1 is a structural schematic view of an optical lens in a long focal length state according to an embodiment of the present disclosure.

Embodiments of the present disclosure will be further described below by referring to the accompanying drawings. Same or similar reference numerals in the accompanying drawings indicate the same or similar components or components having the same or similar functions.

In addition, the embodiments of the present disclosure described below by referring to the accompanying drawings are exemplary and are intended only to explain the embodiments of the present disclosure, but do not limit the present disclosure.

In the present disclosure, unless otherwise expressively specified and limited, a first feature being "above" or "below" a second feature may be direct contact between the first feature and the second feature, or indirect contact between the first feature and the second feature through an intermediate medium. In addition, the first feature being "above", "on" and "on top of" the second feature may indicate the first feature being directly above or diagonally above the second feature, or simply indicate that the first feature is horizontally higher than the second feature. The first feature being "below", "under", and "at a bottom of" the second feature may indicate the first feature being directly below or diagonally below the second feature, or simply indicate that a horizontal height of the first feature is less than that of the second feature.

Figure 2:
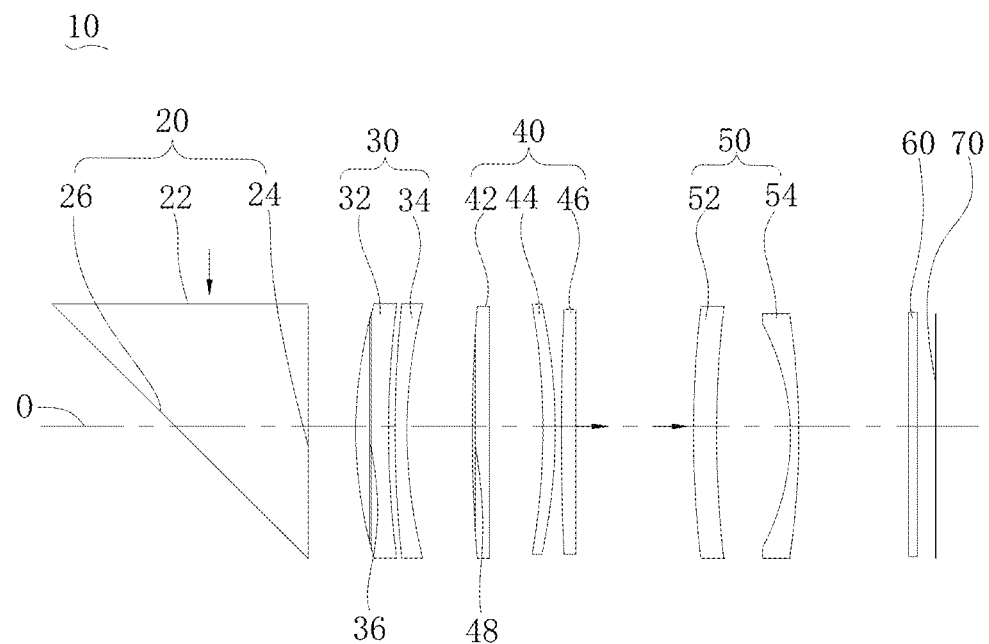
FIG. 2 is a structural schematic view of an optical lens in a short focal length state according to an embodiment of the present disclosure.

As shown in FIGS. 1 and 2, the present disclosure provides an optical lens 10. Along a direction from an object side to an imaging side, the optical lens 10 successively includes a prism 20, a first lens group 30, a second lens group 40, and a third lens group 50. The prism 20 is fixed relative to an imaging surface 70 of the optical lens 10. A first diaphragm 36 is disposed between the first lens group 30 and the prism 20. A second diaphragm 48 is disposed between the second lens group 40 and the third lens group 50 or between the first lens group 30 and the second lens group 40. When the optical lens 10 switches between a short focal length state and a long focal length state, the prism 20 is fixed, the first lens group 30 and the first diaphragm 36 are fixed relative to the prism 20, and the second lens group 40, the third lens group 50, and the second diaphragm 48 move along an optical axis O of the optical lens 10 relative to the prism 20. In this way, in the long focal length state, the first diaphragm 36 is an aperture diaphragm, and the second diaphragm 48 is a stray light elimination diaphragm. In the short focal length state, the second diaphragm 48 is an aperture diaphragm, and the first diaphragm 36 is a stray light elimination diaphragm.

In the present disclosure, the optical lens 10 is arranged with the first diaphragm 36 and the second diaphragm 48. The second diaphragm 48, the second lens group 40, and the third lens group 50 are movable relative to the prism 20, such that, in the long focal length state, the first diaphragm 36 serves as the aperture diaphragm, and the second diaphragm 48 serves as the stray light elimination diaphragm; and in the short focal length state, the second diaphragm 48 serves as the aperture diaphragm, and the first diaphragm 36 serves as the stray light elimination diaphragm. In this way, a risk of stray light or vignetting of the optical lens 10 is reduced, and the performance of the optical lens 10 is improved.

In detail, as shown in FIGS. 1 and 2, the optical lens 10 includes the prism 20, the first lens group 30, the second lens group 40, the third lens group 50, the first diaphragm 36, the second diaphragm 48, a filter 60, and the imaging surface 70. Along the direction from the object side to the imaging side, the prism 20, the first lens group 30 (the first diaphragm 36 together with the first lens group 30), the second lens group 40 (the second diaphragm 48 together with the second lens group 40), the third lens group 50, the filter 60, and the imaging surface 70 are arranged successively.

The prism 20 includes a light inlet surface 22, a light outlet surface 24, and a reflective surface 26. External light is injected through the light inlet surface 22 of the prism 20, reflected by the reflective surface 26 of the prism 20, then emitted to out of the prism 20 through the light outlet surface 24, and reaches the first lens group 30. In the present embodiment, the prism 20 is a right-angle prism 20. For example, when the prism 20 is viewed from a side perpendicular to the optical axis O, the prism 20 is shown as a right triangle. Two sides at which two short sides of the right triangle of the prism 20 locate are the light inlet surface 22 and the light outlet surface 24, respectively. A side at which a long side of the right triangle of the prism 20 locates is the reflective surface 26. An angle between the light inlet surface 22 and the reflective surface 26 may be 45 degrees, 30 degrees, 60 degrees, and the like. In the present embodiment, the angle between the light inlet surface 22 and the reflective surface 26 is 45 degrees. In some embodiments, the external light may be reflected by the reflective surface 26 of the prism 20 to directly reach the first lens group 30 without passing through an inside of the prism 20. In this case, no light reaches the light inlet surface 22 or the light outlet surface 24. The surfaces 22 and 24 may not be called "the light inlet surface" and "the light outlet surface". The prism 20, the first lens group 30, the second lens group 40, and the third lens group 50 are co-axial, and an axis shared by these elements is the optical axis O.

The first lens group 30 is spaced apart from and fixed relative to the light outlet surface 24 of the prism 20. A center of the first lens group 30 locates on the optical axis O. The first lens group 30 includes a first lens 32 and a second lens 34. The first lens 32 and the second lens 34 are spaced apart and kept fixed relative to each other. A distance between the first lens 32 and the second lens 34 may be determined based on sizes of the two lenses, optical parameters, and the like, which is not limited by the present disclosure. In some embodiments, the first lens 32 and the second lens 34 are fixed arranged inside the first shell 320 by a transparent lens adhesive (shown in FIG. 5). In some embodiments, a transmission-enhancing film is disposed on at least one of the first lens 32 and the second lens 34, such that intensity of reflected light is reduced, and intensity of transmitted light is increased, allowing the optical lens 10 to image more clearly. For example, the transmission-enhancing film may be disposed on an object side of the first lens 32 or an object side of the second lens 34.

A center of the second lens group 40 locates on the optical axis O. The second lens group 40 is movable along the optical axis O of the optical lens 10 relative to the prism 20. The second lens group 40 includes a third lens 42, a fourth lens 44, and a fifth lens 46 that are fixedly arranged in sequence. The third lens 42, the fourth lens 44, and the fifth lens 46 are spaced apart from each other and are kept fixed relative to each other. A distance between the third lens 42 and the fourth lens 44, and a distance between the fourth lens 44 and the fifth lens 46 may be determined based on sizes of the lenses, optical parameters, and the like, which is not limited by the present disclosure. In some embodiments, the third lens 42, the fourth lens 44 and the fifth lens 46 may be fixedly arranged inside a second shell 420 by a transparent lens adhesive (shown in FIG. 5). In some embodiments, a transmission-enhancing film is disposed on at least one of the third lens 42, the fourth lens 44 and the fifth lens 46, such that intensity of reflected light of the lenses is reduced, and intensity of transmitted light is increased, allowing the optical lens 10 to image more clearly. For example, the transmission-enhancing film may be disposed on an object side of the third lens 42, or an object side of the fourth lens 44, or an object side of the fifth lens 46, and so on, which will not be listed one by one hereinafter.

A center of the third lens group 50 locates on the optical axis O. The third lens group 50 is movable along the optical axis O of the optical lens 10 relative to the prism 20. The third lens group 50 includes a sixth lens 52 and a seventh lens 54. The sixth lens 52 and the seventh lens 54 are spaced apart from and are fixed relative to each other. A distance between the sixth lens 52 and the seventh lens 54 may be determined based on sizes of the lenses, optical parameters, and the like, which is not limited by the present disclosure. In some embodiments, the sixth lens 52 and the seventh lens 54 may be fixedly arranged inside a third shell 520 by a transparent lens adhesive (shown in FIG. 5). In some embodiments, a transmission-enhancing film is disposed on the sixth lens 52 and the seventh lens 54, such that intensity of reflected light of the lenses is reduced, and intensity of transmitted light is increased, allowing the optical lens 10 to image more clearly. For example, the transmission-enhancing film may be disposed on an object side of the sixth lens 52, or an object side of the seventh lens 54, and so on, which will not be listed one by one hereinafter. Changing distances of the second lens group 40 and the third lens group 50 relative to the first lens group 30 may allow the optical lens 10 to switch between the long focal length state and the short focal length state.

Each of the first lens 32, the second lens 34, the third lens 42, the fourth lens 44, the fifth lens 46, the sixth lens 52, and the seventh lens 54 is a non-spheric lens. The first lens 32, the second lens 34, the third lens 42, the fourth lens 44, the fifth lens 46, the sixth lens 52, and the seventh lens 54 are made of transparent materials, such as glass, resin, plastic and the like. For example, all seven lenses may be made of glass or resin. Alternatively, some of the seven lenses may be made of glass, and the rest of the seven lenses may be made of resin. The present disclosure does not limit the materials for making the lenses.

Figure 7:
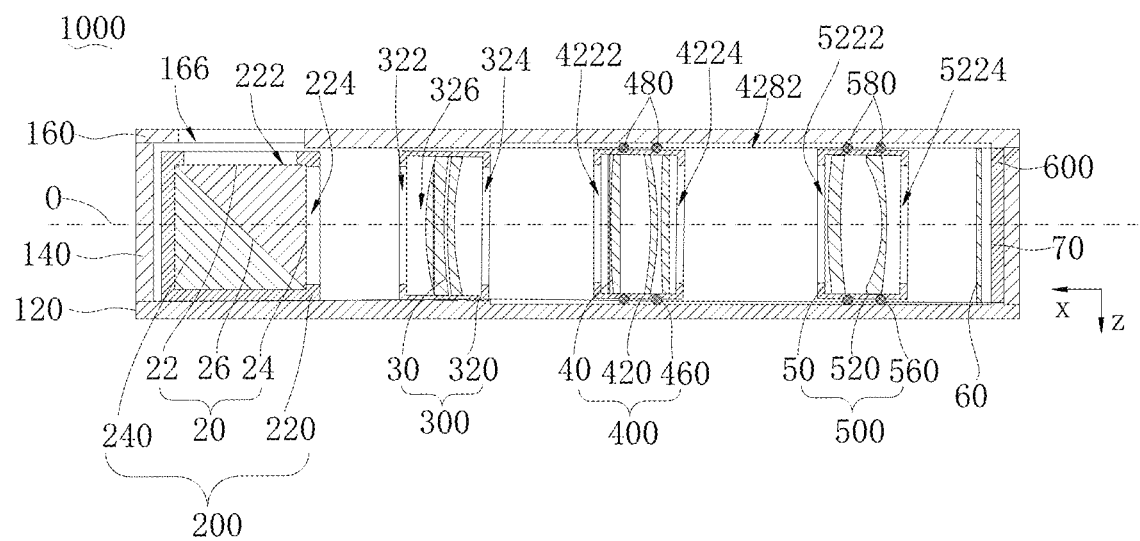
FIG. 7 is a cross section view of the camera module shown in FIG. 3 taken along a line VII-VII, wherein the optical lens is in a short focal length state.

Each of the first diaphragm 36 and the second diaphragm 48 is a diaphragm having a fixed aperture size. A physical aperture size of first diaphragm 36 is D1, and a physical aperture size of second diaphragm 48 is D2. The first diaphragm 36 is disposed between the first lens group 30 and the prism 20. Disposing the first diaphragm 36 between the first lens group 30 and the prism 20 may refer to the first diaphragm 36 disposed on the first lens group 30; or the first diaphragm 36 disposed on the prism 20; or the first diaphragm 36 disposed at any position in a space between the first lens group 30 and the prism 20. In the present embodiment, the first diaphragm 36 is disposed on the object side of the first lens 32. The first diaphragm 36 and the first lens group 30 are fixedly arranged in the first shell 320 by glue, by snapping, and the like, such that the first diaphragm 36 is fixed relative to the first lens group 30 (as shown in FIG. 7). In other embodiments, the first diaphragm 36 may be disposed on the light outlet surface 24 of the prism 20. In some embodiments, the first diaphragm 36 may be disposed on the object side of the second lens 34. In some embodiments, the first diaphragm 36 may be disposed in the space between the first lens 32 and the second lens 34. The present disclosure does not limit the position of the first diaphragm 36, as long as the first diaphragm 36 is disposed between the first lens group 30 and the prism 20.

The second diaphragm 48 does not coincide with the first diaphragm 36. The second diaphragm 48 is disposed between the second lens group 40 and the third lens group 50 or between the first lens group 30 and the second lens group 40. In other words, the second diaphragm 48 is disposed at any position between the second lens 34 and the imaging surface 70, and the second diaphragm 48 may move along with the third lens group 50. Disposing the second diaphragm 48 between the second lens group 40 and the third lens group 50 may refer to the second diaphragm 48 being disposed on the second lens group 40; or the second diaphragm 48 being disposed on the third lens group 50; or the second diaphragm 48 being disposed at any position in a space between the second lens group 40 and the third lens group 50. Disposing the second diaphragm 48 between the first lens group 30 and the second lens group 40 may refer to the second diaphragm 48 being disposed on the second lens group 40; or the second diaphragm 48 being disposed on the first lens group 30; or the second diaphragm 48 being disposed at any position in a space between the second lens group 40 and the first lens group 30. In the present embodiment, the second diaphragm 48 is disposed between the first lens group 30 and the second lens group 40, and the second diaphragm 48 is disposed on the object side of the third lens 42, such that the second diaphragm 48 moves along with the second lens group 40 (as shown in FIG. 7, the second diaphragm 48 and the second lens group 40 may be fixed in the second shell 420 by glue, by snapping, and the like. The second diaphragm 48 may be fixed relative to the second lens group 40. When the second shell 420 moves, the second diaphragm 48 and the second lens group 40 may move along with the second shell 420). In other embodiments, the second diaphragm 48 may be disposed in the space between the second lens 34 and the third lens 42, and the second diaphragm 48 is fixed to the second lens group 40 and moves along with the second lens group 40. In some embodiments, the second diaphragm 48 may be disposed in the space between the sixth lens 52 and the seventh lens 54, and the second diaphragm 48 is fixed to the third lens group 50 and moves along with the third lens group 50. In some embodiments, the second diaphragm 48 may be disposed in the space between the seventh lens 54 and the imaging surface 70, and the second diaphragm 48 is fixed to the third lens group 50 and moves along with the third lens group 50 (when the second diaphragm 48 moves along with the third lens group 50, installation of the second diaphragm 48 and the third lens group 50 may be referred to installation of the second diaphragm 48 and the second lens group 40). The present disclosure does not limit the position of the second diaphragm 48, as long as the position of the second diaphragm 48 and the first diaphragm 36 do not coincide with each other, and the second diaphragm 48 is disposed at any position in the space between the second lens 34 and the imaging surface 70.

The closer to the prism 20 the first diaphragm 36 and the second diaphragm 48 are disposed, the smaller the radial sizes of the first lens 32, the second lens 34, the third lens 42, the fourth lens 44, the fifth lens 46, the sixth lens 52, and the seventh lens 54 are. Therefore, the radial sizes of the first lens 32, the second lens 34, the third lens 42, the fourth lens 44, the fifth lens 46, the sixth lens 52, and the seventh lens 54 may be adjusted by adjusting the positions of the first diaphragm 36 and the second diaphragm 48, such that the optical lens 10 may be miniaturized.

The filter 60 is an infrared filter and is disposed between the seventh lens 54 and the imaging surface 70. That is, the filter 60 is disposed in the space between the third lens group 50 and the imaging surface 70.

When the optical lens 10 switches between the short focal length state (shown in FIG. 2) and the long focal length state (shown in FIG. 1), the prism 20 is fixed, the first lens group 30 and the first diaphragm 36 are fixed relative to the prism 20, and the second lens group 40, the second diaphragm 48, and the third lens group 50 move along the optical axis O of the optical lens 10 relative to the prism 20 or relative to the first lens group 30. In this way, in the long focal length state, the first diaphragm 36 serves as the aperture diaphragm, and the second diaphragm 48 serves as the stray light elimination diaphragm; and in the short focal length state, the second diaphragm 48 serves as the aperture diaphragm, and the first diaphragm 36 serves as the stray light elimination diaphragm.

When the optical lens 10 is switched from the long focal length state to the short focal length state, the prism 20 is fixed, the first lens group 30 and the first diaphragm 36 are fixed relative to the prism 20, the third lens group 50 moves from the imaging side to the object side along the optical axis O, and the second lens group 40 and the second diaphragm 48 move from the object side to the imaging side along the optical axis O. When the optical lens 10 is switched from the short focal length state to the long focal length state, the prism 20 is fixed, the first lens group 30 and the first diaphragm 36 are fixed relative to the prism 20, the third lens group 50 moves from the object side to the imaging side along the optical axis O, and the second lens group 40 and the second diaphragm 48 move from the imaging side to the object side along the optical axis O.

The physical aperture size of the first diaphragm 36 is D1, and the physical aperture size of the second diaphragm 48 is D2. When the optical lens 10 is in the long focal length state, a light beam aperture size at a location where the first diaphragm 36 is disposed is A1, and a light beam aperture size at a location where the second diaphragm 48 is disposed is A2. D1=A1, D2>A2, a focal length f=23 mm, F/#=4.4, and a field of view angle is 20 degrees. When the optical lens 10 is in the short focal length state, a light beam aperture size at a location where the first diaphragm 36 is disposed is B1, and a light beam aperture size at a location where the second diaphragm 48 is disposed is B2. D2=B2, D1>B1, the focal length f=14 mm, F/#=3.2, and the field of view is 30.5 degrees.

Figure 3:
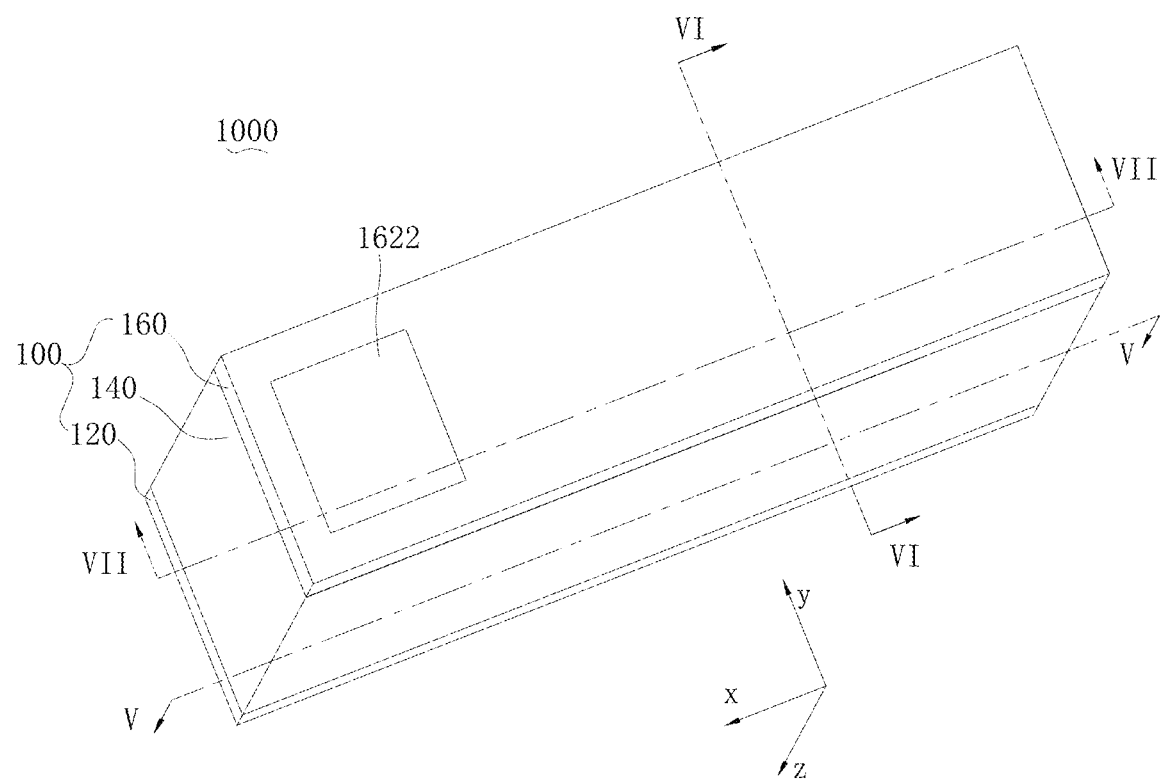
FIG. 3 is a perspective view of a camera module according to an embodiment of the present disclosure.
Figure 4:
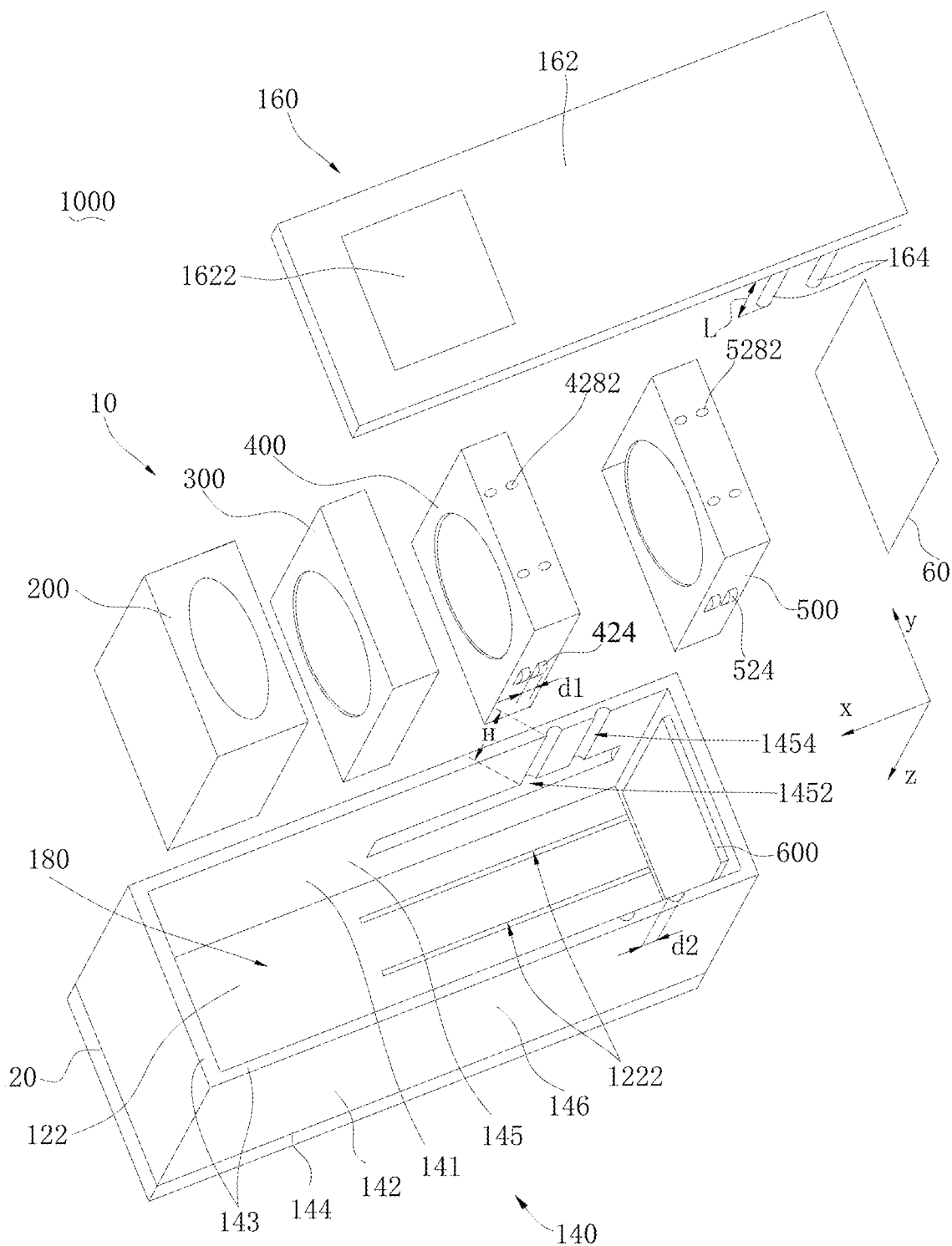
FIG. 4 is an explosive view of the camera module shown in FIG. 3.

As shown in FIGS. 2 to 4, the camera module 1000 includes a shell 100, a prism assembly 200, a first lens assembly 300, a second lens assembly 400, and a third lens assembly 500, an optical lens 10, and a light sensitive element 600. The prism 20 of the optical lens 10 is mounted in the prism assembly 200, the first lens group 30 is mounted in the first lens assembly 300, the second lens group 40 is mounted in the second lens assembly 400, and the third lens group 50 is mounted in the third lens assembly 500. The prism assembly 200, the first lens assembly 300, the second lens assembly 400, the third lens assembly 500, the filter 60, and the light sensitive element 600 are successively arranged inside the shell 100. The prism assembly 200 and the first lens assembly 300 are spaced apart from each other and fixedly arranged inside the shell 100. The second lens assembly 400 and the third lens assembly 500 are slidably arranged inside the shell 100, and are movable relative to the first lens assembly 300. The imaging surface 70 of the optical lens 10 is formed on a surface of the light sensitive element 600 facing the third lens assembly 500. In other words, the surface of the light sensitive element 600 facing the third lens assembly 500 serves as the imaging surface 70. The light sensitive element 600 is opposite and fixed to the prism assembly 200. The light sensitive element 600 is configured to convert a received light signal into an electrical signal.

In detail, as shown in FIG. 3 and FIG. 4, the shell 100 includes a substrate 120, a side plate 140 and a cover 160. The substrate 120, the side plate 140 and the cover 160 cooperatively defines a receiving space 180. The prism assembly 200, the first lens assembly 300, the second lens assembly 400, the third lens assembly 500 and the light sensitive element 600 are received in the receiving space 180.

As shown in FIG. 4, for subsequent description, a direction parallel to the optical axis O is defined as an x-direction, and a direction perpendicular to the x-direction is defined as a y-direction and a z-direction. Any two of the x-direction, y-direction and z-direction are perpendicular to each other.

The substrate 120 includes a carrying surface 122 for carrying the side plate 140. The substrate 120 may be rectangular, cuboid, cylindrical, or a structure in other shapes, which will not be limited by the present disclosure. In the present embodiment, the substrate 120 is rectangular.

As shown in FIG. 4, the side plate 140 includes an inner surface 141, an outer surface 142, an upper surface 143, and a lower surface 144. The inner surface 141 is opposite to the outer surface 142. The inner surface 141 is received in the receiving space 180. The outer surface 142 is exposed out of the receiving space 180. The inner surface 141 is connected to both the upper surface 143 and the lower surface 144. The outer surface 142 is connected to both the upper surface 143 and the lower surface 144. The upper surface 143 is opposite to the lower surface 144. The lower surface 144 is attached to the carrying surface 122 of the substrate 120, and the upper surface 143 is opposite to the carrying surface 122 of the substrate 120.

Figure 6:
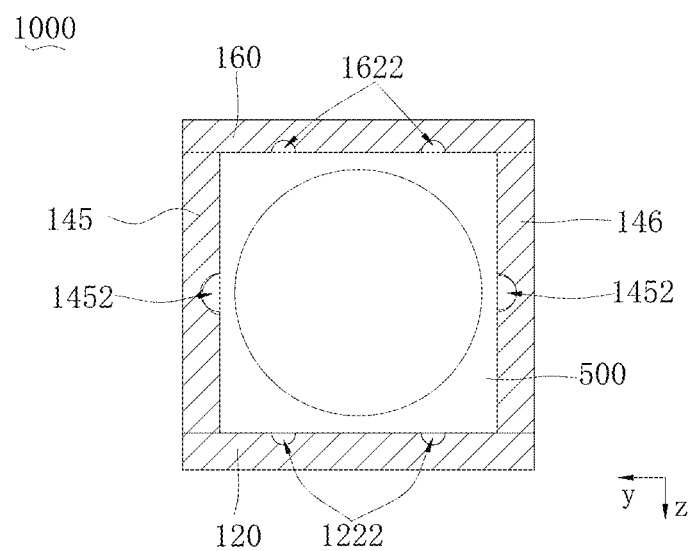
FIG. 6 is a cross section view of the camera module shown in FIG. 3 taken along a line VI-VI.

As shown in FIG. 6, the side plate 140 further includes a first side plate 145 and a second side plate 146 that are parallel to the x-direction. In detail, a length direction of the first side plate 145 and a length direction of the second side plate 146 are parallel to the x-direction. The first side plate 145 is opposite to the second side plate 146. The inner surface 141 of the first side plate 145 and/or the inner surface 141 of the second side plate 146 defines a slide groove 1452 and a mounting slot 1454. For example, the inner surface 141 of the first side plate 145 defines the slide groove 1452 and the mounting slot 1454. Alternatively, the inner surface 141 of the second side plate 146 defines the slide groove 1452 and the mounting slot 1454. Alternatively, each of the inner surface 141 of the first side plate 145 and the inner surface 141 of the second side plate 146 defines the slide groove 1452 and the mounting slot 1454. In the present embodiment, each of the inner surface 141 of the first side plate 145 and the inner surface 141 of the second side plate 146 defines the slide groove 1452 and the mounting slot 1454, and an extending direction of the slide groove 1452 is parallel to the carrying surface 122.

The slide groove 1452 is communicated to the receiving space 180. The extending direction of the slide groove 1452 is also parallel to the x-direction. A depth of the slide groove 1452 is less than a thickness of the side plate 140. That is, the slide groove 1452 does not penetrate through the outer surface 142 of the side plate 140. In other embodiments, the slide groove 1452 may penetrate through the outer surface 142 of the side plate 140 to allow the receiving space 180 to be communicated to the outside. The number of slide grooves 1452 defined in the inner surface 141 of the first side plate 145 and in the inner surface of the second side plate 146 may be one or more. For example, the inner surface 141 of the first side plate 145 defines one slide groove 1452, and the inner surface 141 of the second side plate 146 defines one slide groove 1452. In another example, the inner surface 141 of the first side plate 145 defines two slide grooves 1452, and the inner surface 141 of the second side plate 146 defines two slide grooves 1452. In still another example, the inner surface 141 of the first side plate 145 defines one slide groove 1452, and the inner surface 141 of the second side plate 146 defines two slide grooves 1452. The present disclosure will not list all the possibilities. In the present embodiment, each of the inner surface 141 of the first side plate 145 and the inner surface 141 of the second side plate 146 defines one slide groove 1452. A shape of the slide groove 1452 intercepted by a plane perpendicular to the x-direction may be rectangular, semicircular, or in other shapes, such as other regular shapes or irregular shapes. As shown in FIG. 6, in the present embodiment, the slide groove 1452 may be intercepted by the plane perpendicular to the x-direction into a D-shape.

The mounting slot 1454 is communicated to the receiving space 180. An end of the mounting slot 1454 extends through the upper surface 143 of the side plate 140, and the other end of the mounting slot 1454 is communicated to the slide groove 1452. An extension direction of the mounting slot 1454 may be perpendicular or inclined to the extension direction of the slide groove 1452. For example, the extension direction of the mounting slot 1454 is perpendicular to the x-direction. Alternatively, the extension direction of the mounting slot 1454 is inclined at a certain angle (not 0 degree, but may be 30 degrees, 60 degrees, 75 degrees, and the like) to the x-direction. In the present embodiment, the extension direction of the mounting slot 1454 is perpendicular to the x-direction. The number of mounting slots 1454 defined in the inner surface 141 of the first side plate 145 and in the inner surface 141 of the second side plate 146 may be one or more. For example, the inner surface 141 of the first side plate 145 defines one mounting slot 1454, and the inner surface 141 of the second side plate 146 defines one mounting slot 1454. In another example, the inner surface 141 of the first side plate 145 defines two mounting slots 1454, and the inner surface 141 of the second side plate 146 defines two mounting slots 1454. In still another example, the inner surface 141 of the first side plate 145 defines one mounting slot 1454, and the inner surface 141 of the second side plate 146 defines two mounting slots 1454. The present disclosure will not list all possibilities. In the present embodiment, each of the inner surface 141 of the first side plate 145 and the inner surface 141 of the second side plate 146 defines two mounting slots 1454.

As shown in FIG. 4, the cover 160 is disposed on the upper surface 143 of the side plate 140. In detail, the cover 160 may be mounted to the upper surface 143 of the side plate 140 by snapping, by screwing, by glue, and the like. The cover 160 includes a cover body 162 and an abutting portion 164.

The cover body 162 is attached with the upper surface 143 of the side plate 140. The cover body 162 defines a light inlet port 1622. A depth direction of the light inlet port 1622 may be perpendicular to the x-direction, such that the entire camera module 1000 may be in a periscopic structure. The external light can be directed into the receiving space 180 through the light inlet port 1622.

The abutting portion 164 is disposed on each of two sides of the cover body 162. In detail, one of the two sides of the cover body 162 corresponds to the first side plate 145, and the other one of the two sides of the cover body 162 corresponds to the second side plate 146. When the cover 160 is mounted on the side plate 140, the abutting portion 164 is received in the mounting slot 1454. A length L of the abutting portion 164 along the z-direction is equal to a depth H of the mounting slot 1454 along the z-direction. The abutting portion 164 being received in the mounting slot 1454 may refer to the abutting portion 164 being received in the mounting slot 1454 and occupying a partial space of the mounting slot 1454. The abutting portion 164 being received in the mounting slot 1454 may also refer to the abutting portion 164 being received in the mounting slot 1454 and occupying the entire space of the mounting slot 1454. In the present embodiment, when the abutting portion 164 is received in the mounting slot 1454, the abutting portion 164 occupies the entire space of the mounting slot 1454. The abutting portion 164 is more firmly attached to a wall of the mounting slot 1454 to allow the cover 160 to be connected to the side plate 140 more stably. In other embodiments, the light inlet port is not a through hole, but a light-transmitting solid structure, and the light may be directed into the receiving space 180 through the light-transmitting solid structure.

Figure 5:
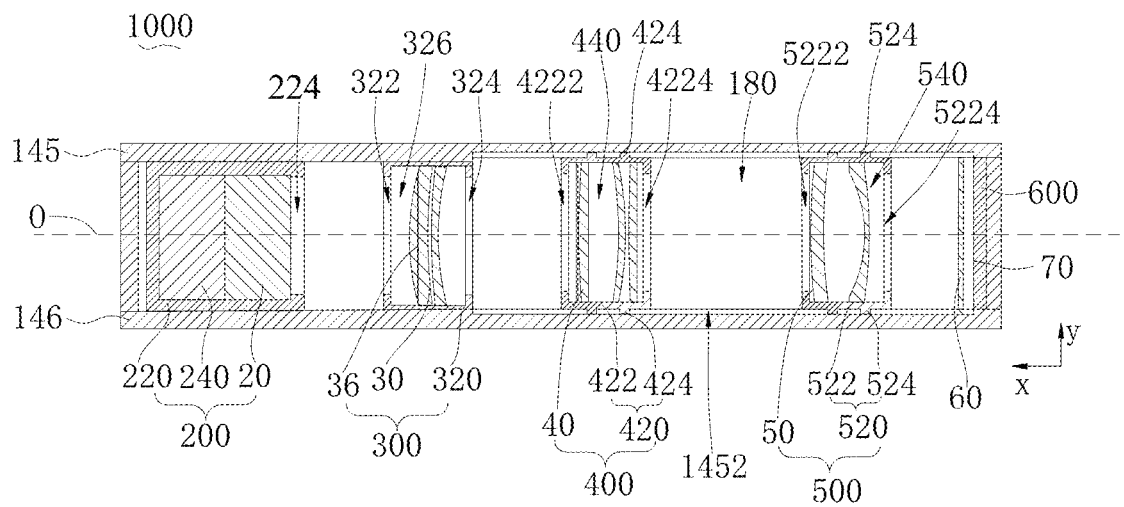
FIG. 5 is a cross section view of the camera module shown in FIG. 3 taken along a line V-V, wherein the optical lens is in a short focal length state.

As shown in FIGS. 4, 5, and 7, the prism assembly 200 is arranged inside the shell 100 and is received in the receiving space 180. The prism assembly 200 is opposite to the light inlet port 1622 of the cover 160. The prism assembly 200 includes a prism shell 220, the prism 20 of the optical lens 10 of any of the above embodiments, and a mounting stage 240 for mounting the prism 20. The prism 20 may be mounted inside the prism shell 220 by glue, by snapping, or the like.

In detail, the prism shell 220 defines a light inlet through hole 222 and a light outlet through hole 224. The light inlet through hole 222 faces the light inlet port 1622 of the cover 160, and the light inlet through hole 222 is communicated to the light inlet port 1622 and an inside of the prism shell 220. The light outlet through hole 222 faces the imaging surface 70 and is communicated to the receiving space 180. The external light enters through the light inlet port 1622, and passes through the light inlet through hole 222 to reach the light inlet surface 22 of the prism 20. Further, the light is reflected by the reflective surface 26 of the prism 20, and reaches an outside of the first lens assembly 300 through the light outlet surface 24. The light outlet surface 24 of the prism 20 is perpendicular to the x-direction. The reflective surface 26 of the prism 20 abuts against the carrying surface 122 of the substrate 120. The prism shell 220 defines an accommodating space for the prism 20 to be mounted. The prism shell 220 may be mounted on the carrying surface 122 by glue, by snapping, or the like.

The mounting stage 240 is arranged inside the prism shell 220. In detail, the mounting stage 240 may be arranged inside the prism shell 220 by glue, by screwing, by snapping, or the like. The mounting stage 240 and the prism shell 220 may be an integral and overall component. The reflective surface 26 of the prism 20 abuts against the mounting stage 240. The prism 20 may also be fixed on the mounting stage 240 by glue, by snapping, or the like.

As shown in FIGS. 4, 5, and 7, the first lens assembly 300 is received in the receiving space 180 and is disposed between the prism 20 and the imaging surface 70. The first lens assembly 300 is fixedly arranged inside the shell 100 and is spaced apart from the prism 20. The first lens assembly 300 includes a first shell 320, the first lens group 30 and the first diaphragm 36 of the optical lens 10 in any of the above embodiments mounted inside the first shell 320. The first lens group 30 and the first diaphragm 36 may be mounted inside the first shell 320 by glue, by snapping, or the like. The first shell 320 may be mounted in the inside of the shell 100 by glue, by snapping, or the like.

The first shell 320 defines a first light inlet port 322 and a first light outlet port 324 opposite to the prism 20. The first shell 320 defines a first accommodating space 326 to receive the first lens assembly 30 and the first diaphragm 36. The first accommodating space 326 is communicated to the receiving space 180 through the first light inlet port 322 and the first light outlet port 324. The first light inlet port 322 is opposite to the light outlet through hole 224 of the prism assembly 200. The first light outlet port 324 is opposite to the second lens assembly 400. The first lens assembly 30 and the first diaphragm 36 may be mounted inside the first shell 320 by glue, by snapping, or the like.

A lens in the first lens group 300 is a part of a rotating body. For example, a lens in the first lens group 300 is firstly formed into a rotating body lens by a mold. Further, an edge of the rotating body lens is cut. A cutting ratio may be determined based on a size of an internal space of the camera module 1000, optical parameters, and other factors, such that a lens (a face of the square shaped lens or the rectangular shaped lens that the optical axis O passes through is concaved or convexed) that is approximately square shaped or rectangular shaped is formed. Alternatively, lenses in the first lens group 30 are all made directly by a particular mold, and a cavity of the mold is a part of the rotating body, such that the lenses in the first lens group 30 are made directly. In this way, sizes of the lenses in the first lens group 30 are significantly reduced, such that an overall size of the camera module 1000 is reduced, allowing the camera module 1000 to be miniaturized.

As shown in FIGS. 4, 5, and 7, the second lens assembly 400 is mounted inside the shell 100 and is received in the receiving space 180. The second lens assembly 400 is disposed between the first lens assembly 300 and the imaging surface 70. The second lens assembly 400 is movable along the optical axis O relative to the first lens assembly 300. The second lens assembly 400 includes a second shell 420, the second lens group 40 and the second diaphragm 48 of the optical lens 10 of any of the above implementations mounted inside the second shell 420. The second lens group 40 and the second diaphragm 48 may be mounted to the second shell 420 by glue, by snapping, or the like. When the second shell 420 slides, the second shell 420 drives the second lens group 40 and the second diaphragm 48 to slide.

In detail, the second shell 420 includes a second body 422 and a second slide block 424. The second slide block 424 is fixedly connected to the second body 422.

The second body 422 defines a second light inlet port 4222 and a second light outlet port 4224 corresponding to the second lens group 40. The second body 422 defines a second accommodating space 440 to receive the second lens group 40 and the second diaphragm 48. The second accommodating space 440 is communicated to the receiving space 180 through the second light inlet port 4222 and the second light outlet port 4224. The second light inlet port 4222 is opposite to the first light outlet port 324 of the first lens assembly 300, and the second light outlet port 4224 is opposite to the third lens assembly 500.

The second slide block 424 is disposed on a surface of the second body 422 that is opposite to the inner surface 141 of the first side plate 145 and/or the inner surface 141 of the second side plate 146. For example, the second slide block 424 is disposed on a surface of the second body 422 opposite to the inner surface 141 of the first side plate 145. Alternatively, the second slide block 424 is disposed on a surface of the second body 422 opposite to the inner surface 141 of the second side plate 146. Alternatively, the second slide block 424 is disposed on each of the surface of the second body 422 opposite to the inner surface 141 of the first side plate 145 and the surface of the second body 422 opposite to the inner surface 141 of the second side plate 146. In the present embodiment, the second slide block 424 is disposed on each of the surface of the second body 422 opposite to the inner surface 141 of the first side plate 145 and the surface of the second body 422 opposite to the inner surface 141 of the second side plate 146. The second slide block 424 extends through the mounting slot 1454 to further slide into the slide groove 1452, such that the second slide block 424 is slidably received in the slide groove 1452.

As shown in FIG. 4 and FIG. 7, the number of second slide blocks 424 matches the number of corresponding mounting slots 1454. The number of second slide blocks 424 matching the number of corresponding mounting slots 1454 may refer to the number of second slide blocks 424 disposed on the surface of the second body 422 opposite to the inner surface 141 of the first side plate 145 being equal to the number of mounting slots 1454 defined in the inner surface 141 of the first side plate 145, the number being two; and the number of second slide blocks 424 disposed on the surface of the second body 422 opposite to the inner surface 141 of the second side plate 146 being equal to the number of mounting slots 1454 defined in the inner surface 141 of the second side plate 146, the number being two. The two second slide blocks 424 are in one-to-one correspondence to the two mounting slots 1454. In other embodiments, the number of second slide blocks 424 may be less than the number of mounting slots 1454. For example, the number of second slide blocks 424 disposed on the surface of the second body 422 opposite to the inner surface 141 of the first side plate 145 is less than the number of mounting slots 1454 defined in the inner surface 141 of the first side plate 145, and the number of second slide blocks 424 disposed on the surface of the second body 422 opposite to the inner surface 141 of the second side plate 146 is less than the number of mounting slots 1454 defined in the inner surface 141 of the second side plate 146. Moreover, a length d1 of the second slide block 424 along the x-direction is less than or equal to a length d2 of the mounting slot 1454 along the x-direction, facilitating the second slide block 424 to extend through the mounting slot 1454 to further slide into the slide groove 1452.

A shape of the second slide block 424 intercepted by the face perpendicular to the x-direction may be rectangular, semicircular, or in other shapes, such as other regular shapes or irregular shapes, as long as the shape of the second slide block 424 matches the shape of the corresponding slide groove 1452. In detail, the shape of the second slide block 424 matching the shape of the corresponding slide groove 1452 may indicate that, when the slide groove 1452 defined in the inner surface 141 of the first side plate 145 is intercepted by the face perpendicular to the x-direction into the rectangular shape, the second slide block 424 disposed on the surface of the second body 422 opposite to the inner surface 141 of the first side plate 145 is also intercepted by the face perpendicular to the x-direction into the rectangular shape; when the slide groove 1452 defined in the inner surface 141 of the second side plate 146 is intercepted by the face perpendicular to the x-direction into the rectangular shape, the second slide block 424 disposed on the surface of the second body 422 opposite to the inner surface 141 of the second side plate 146 is also intercepted by the face perpendicular to the x-direction into the rectangular shape; when the slide groove 1452 defined in the inner surface 141 of the first side plate 145 is intercepted by the face perpendicular to the x-direction into the semicircular shape, the second slide block 424 disposed on the surface of the second body 422 opposite to the inner surface 141 of the first side plate 145 is also intercepted by the face perpendicular to the x-direction into the semicircular shape; and when the slide groove 1452 defined in the inner surface 141 of the second side plate 146 is intercepted by the face perpendicular to the x-direction into the semicircular shape, the second slide block 424 disposed on the surface of the second body 422 opposite to the inner surface 141 of the second side plate 146 is also intercepted by the face perpendicular to the x-direction into the semicircular shape. The present disclosure will not list all the possibilities.

As shown in FIG. 6, in the present embodiment, the second slide block 424 is intercepted by the face perpendicular to the x-direction into an irregular shape. The irregular shape is a closed "D" shape formed by a straight line and an arc. An outer wall of the second slide block 424 is intercepted into a shape corresponding to the arc of the "D" shape. The shape of the second slide block 424 matching the shape of the corresponding slide groove 1452 may refer to a curvature of an arc corresponding to an inner wall of the slide groove 1452 being equal to a curvature of the arc corresponding to the outer wall of the second slide block 424. In this way, the second slide block 424 may match the slide groove 1452 more properly.

In the z-direction, two opposite ends of the second slide block 424 abut against two opposite ends of the inner wall of the slide groove 1452. In detail, when the second slide block 424 is received in the slide groove 1452, in the z-direction, two opposite ends of the second slide block 424 corresponding to the first side plate 145 abut against two opposite ends of the inner wall of the slide groove 1452 defined in the inner surface 141 of the first side plate 145. Two opposite ends of the second slide block 424 corresponding to the second side plate 146 abut against two opposite ends of the inner wall of the slide groove 1452 defined in the inner surface 141 of the second side plate 146. In this way, movement of the second slide block 424 in the z-direction is limited, preventing the second slide block 424 from shaking or tilting in the z-direction and ensuring that imaging quality of the camera module 1000 is not affected.

As shown in FIGS. 4 and 6 to 8, in some embodiments, the second shell 420 further includes a second bottom surface 426 and a second top surface 428 opposite to the second bottom surface 426. The second top surface 428 is opposite to the cover 160. The second bottom surface 426 is opposite to the carrying surface 122 of the substrate 120. A groove-rail mating structure is configured between the second bottom surface 426 and the carrying surface 122 of the substrate 120 or between the second top surface 428 and the cover 160. In the present embodiment, the groove-rail mating structure is configured between the second bottom surface 426 and the carrying surface 122 of the substrate 120 and between the second top surface 428 and the cover 160.

In detail, the second bottom surface 426 defines a first recess 4262, and a surface of the substrate 120 opposite to the second bottom surface 426 (i.e., the carrying surface 122) is arranged with a first slide rail 1222. The second lens assembly 400 further includes a first rolling ball 460, and the first rolling ball 460 is received in the first recess 4262 and abuts against a bottom of the first slide rail 1222.

A shape of the first recess 4262 matches a shape of the first rolling ball 460. For example, the first rolling ball 460 is spherical, and a resistance against movement of the first rolling ball 460 may be relatively low. The first recess 4262 is a semi-circular recess. A diameter of the first rolling ball 460 is equal to a diameter of the first recess 4262. That is, a half of the first rolling ball 460 is received in the first recess 4262. The first rolling ball 460 is tightly received in the first recess 4262. While the first rolling ball 460 is moving, the first shell 320 of the second lens assembly 400 is driven to move. The carrying surface 122 is arranged with the first slide rail 1222. The first slide rail 1222 may be a recess defined in the carrying surface 122 extending in a direction parallel to the x-direction. The first slide rail 1222 may also be a protrusion disposed on the carrying surface 122 extending in the direction parallel to the x-direction. A surface of the protrusion opposite to the second bottom surface 426 of the second shell 420 defines a recess that receives the first rolling ball 460. In the present embodiment, the first slide rail 1222 is the recess defined in the carrying surface 122 extending in the direction parallel to the x-direction. After the second lens assembly 400 is received in the receiving space 180, a portion of the first rolling ball 460 is received in the first slide rail 1222 and abuts against a bottom of the first slide rail 1222. An inner wall of the first slide rail 1222 is intercepted by the face perpendicular to the x-direction into a first arc shape. An outer profile of the first rolling ball 460 is intercepted by the face perpendicular to the x-direction into a second arc shape. A curvature of the first arc shape is equal to a curvature of the second arc shape. While the first rolling ball 460 is rotating along the first slide rail 1222, in the y-direction, two opposite sides of an outer wall of the first rolling ball 460 abut against two opposite sides of an inner wall of the first slide rail 1222, such that movement of the first rolling ball 460 in the y-direction is limited, preventing the second lens assembly 400 from shaking or tilting in the y-direction.

The number of first recesses 4262 is one or more. For example, the number of first recesses 4262 may be one, two, three, four, or more. In the present embodiment, the number of first recesses 4262 is four. The number of first rolling balls 460 may also be one or more. In the present embodiment, the number of first rolling balls 460 is equal to the number of first recesses 4262, which is four. The four first recesses 4262 are spaced apart each other and are defined in the second bottom surface 426.

The number of first slide rails 1222 may be one or more. The number of first slide rails 1222 may be determined based on positions of the four first recesses 4262. For example, when centers of the four first recesses 4262 are in a straight line parallel to the x-direction, only one first slide rail 1222 needs to be defined. In another example, the four first recesses 4262 are divided into two groups, each of the two groups includes two first recesses 4262. A line connecting centers of the two first recess 4262 in each of the two groups is parallel to the x direction, and the line connecting centers of the two first recess 4262 in one of the two groups does not coincide with the line connecting centers of the two first recess 4262 in the other one of the two groups, two first slide rails 1222 need to be defined, each of the two first slide rails 1222 corresponds to the two first recess 4262 in each of the two groups. In the present embodiment, four first recesses 4262 are divided into two groups, each of the two groups includes two first recesses 4262. A line connecting centers of the two first recess 4262 in one of the two groups is parallel to a line connecting centers of the two first recess 4262 in the other one of the two groups, and the two lines are parallel to the x-direction. The four first recesses 4262 may cooperatively define a rectangle. In this way, while four first rolling balls 460 are sliding in the first slide rail 1222, the four first rolling balls 460 are confined in the two first slide rails 1222. Since, in the y-direction, two opposite sides of the outer wall of each of the four first rolling balls 460 abut against two opposite sides of the inner wall of each of the two first slide rails 1222, the second lens assembly 400 may be prevented from shaking or tilting in the y-direction, ensuring that imaging quality of the camera module 1000 is not affected.

As shown in FIGS. 4 and 6 to 8, the second top surface 428 defines a second recess 4282. The second lens assembly 400 further includes a second rolling ball 480. The second rolling ball 480 is received in the second recess 4282 and abuts against the cover 160.

In detail, a shape of the second recess 4282 matches a shape of the second rolling ball 480. For example, the second rolling ball 480 is spherical, and a resistance against movement of the second rolling ball 480 may be relatively low. The second recess 4282 is a semi-circular recess. A diameter of the second rolling ball 480 is equal to a diameter of the second recess 4282. That is, a half of the second rolling ball 480 is received in the second recess 4282. The second rolling ball 480 is tightly received in the second recess 4282. While the second rolling ball 480 is moving, the shell of the second lens assembly 400 is driven to move. The number of second recesses 4282 is one or more. For example, the number of second recesses 4282 may be one, two, three, four, or more. In the present embodiment, the number of second recesses 4282 is four. The number of second rolling balls 480 may also be one or more. In the present embodiment, the number of second rolling balls 480 is equal to the number of second recesses 4282, which is four. The four second recesses 4282 are spaced apart each other and are defined in the second top surface 428. The second rolling ball 480 is received in the second recess 4282 and abuts against the cover 160, such that the second lens assembly 400 is confined between the cover 160 and the substrate 120, preventing the second lens assembly 400 from shaking or tilting in the z-direction, ensuring that the imaging quality is not affected.

Figure 8:
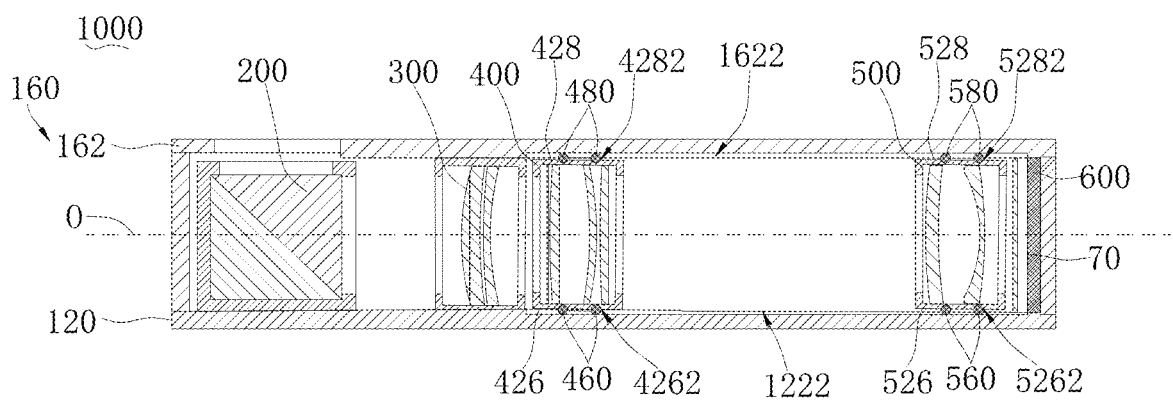
FIG. 8 is a cross section view of the camera module according to an embodiment of the present disclosure, taken along a cross section line corresponding to the line VII-VII in FIG. 3, wherein the optical lens is in a long focal length state.

As shown in FIGS. 6 to 8, a surface of the cover body 162 opposite to the second top surface 428 is arranged with a second slide rail 1622. The second rolling ball 480 is received in the second recess 4282 and abuts against a bottom of the second slide rail 1622.

In detail, the second slide rail 1622 may be a recess defined in the surface of the cover body 162 opposite to the second top surface 428 and extends in the direction parallel to the x-direction. The second slide rail 1622 may also be a protrusion disposed on the surface of the cover body 162 opposite to the second top surface 428 and extends in the direction parallel to the x-direction. A surface of the protrusion opposite to the second top surface 428 defines a recess that receives the second rolling ball 480. In the present embodiment, the second slide rail 1622 is the recess defined in the surface of the cover body 162 opposite to the second top surface 428 and extending in the direction parallel to the x-direction. After the second lens assembly 400 is received in the receiving space 180, a portion of the second rolling ball 480 is received in the second slide rail 1622 and abuts against a bottom of the second slide rail 1622. An inner wall of the second slide rail 1622 is intercepted by the face perpendicular to the x-direction into a third arc shape. An outer profile of the second rolling ball 480 is intercepted by the face perpendicular to the x-direction into a fourth arc shape. A curvature of the third arc shape is equal to a curvature of the fourth arc shape. While the second rolling ball 480 is rotating along the second slide rail 1622, in the y-direction, two opposite sides of the outer wall of the second rolling ball 480 abut against two opposite sides of the inner wall of the second slide rail 1622, such that movement of the second rolling ball 480 in the y-direction is limited, preventing the second lens assembly 400 from shaking or tilting in the y-direction.

The number of second slide rails 1622 may be one or more. The number of second slide rails 1622 may be determined based on positions of the four second recesses 4282. For example, when centers of the four second recesses 4282 are in a straight line parallel to the x-direction, only one second slide rail 1622 needs to be defined. In another example, the four second recesses 4282 are divided into two groups, each of the two groups includes two second recesses 4282. A line connecting centers of the two second recess 4282 in each of the two groups is parallel to the x direction, and the line connecting centers of the two second recess 4282 in one of the two groups does not coincide with the line connecting centers of the two second recess 4282 in the other one of the two groups, two second slide rails 1622 need to be defined, each of the two second slide rails 1622 corresponds to the two second recess 4282 in each of the two groups. In the present embodiment, four second recesses 4282 are divided into two groups, each of the two groups includes two second recesses 4282. A line connecting centers of the two second recess 4282 in one of the two groups is parallel to a line connecting centers of the two second recess 4282 in the other one of the two groups, and the two lines are parallel to the x-direction. The four second recesses 4282 may cooperatively define a rectangle. In this way, while four second rolling balls 480 are sliding in the second slide rail 1622, the four second rolling balls 480 are confined in the two second slide rails 1622. Since, in the y-direction, two opposite sides of the outer wall of each of the four second rolling balls 480 abut against two opposite sides of the inner wall of each of the two second slide rails 1622, the second lens assembly 400 may be prevented from shaking or tilting in the y-direction, ensuring that imaging quality of the camera module 1000 is not affected.

As shown in FIGS. 4 to 7, the third lens assembly 500 is mounted inside the shell 100 and is received in the receiving space 180. The third lens assembly 500 is disposed between the second lens assembly 400 and the imaging surface 70. The third lens assembly 500 is movable along the optical axis O relative to the first lens assembly 300. The third lens assembly 500 includes a third shell 520 and a third lens group 50 of the optical lens 10 in any of the above embodiments mounted inside the third shell 520. The third lens group 50 may be mounted inside the third shell 520 by glue, by snapping, or the like. When the third shell 520 is sliding, the third shell 520 drives the third lens group 50 to slide.

In detail, the third shell 520 includes a third body 522 and a third slide block 524, and the third slide block 524 is fixedly connected to the third body 522.

The third body 522 defines a third light inlet port 5222 and a third light outlet port 5224.

The third light inlet port 5222 corresponds to the second light outlet port 4224 and is opposite to the imaging surface 70. The third body 522 defines a third accommodating space 540 to receive the third lens group 50. The third accommodating space 540 is communicated to the receiving space 180 through the third light inlet port 5222 and the third light outlet port 5224.

Arrangement of the third slide block 524 may be referred to the second slide block 424 and will not be repeatedly described herein.

As shown in FIGS. 4 and 6 to 8, in some embodiments, the third shell 520 further includes a third bottom surface 526 and a third top surface 528 opposite to the third bottom surface 526. The third top surface 528 is opposite to the cover 160. The third bottom surface 526 is opposite to the carrying surface 122 of the substrate 120. A groove-rail mating structure is configured between the third bottom surface 526 and the carrying surface 122 of the substrate 120 or between the third top surface 528 and the cover 160. In the present embodiment, the groove-rail mating structure is configured between the third bottom surface 526 and the carrying surface 122 of the substrate 120 and between the third top surface 528 and the cover 160.

In detail, the third bottom surface 526 defines a third recess 5262. The third lens assembly 500 further includes a third rolling ball 560. The third rolling ball 560 is received in the third recess 5262 and abuts against the bottom of the first slide rail 1222. Connection between the third rolling ball 560 and the third shell 520 may be referred to the connection between the first rolling ball 460 and the second shell 420 and will not be repeatedly described herein.

The third top surface 528 further defines a fourth recess 5282. The third lens assembly 500 further includes a fourth rolling ball 580. The fourth rolling ball 580 is received in the fourth recess 5282 and abuts against the bottom of the second slide rail 1622. Connection between the fourth rolling ball 580 and the third shell 520 may be referred to the connection between the second rolling ball 480 and the second shell 420 and will not be repeatedly described herein.

As shown in FIGS. 4 and 6 to 8, in the present embodiment, the prism assembly 200, the first lens assembly 300, the second lens assembly 400, and the third lens assembly 500 are disposed in sequence along the x-direction (from the object side to the imaging side) in the receiving space 180. The prism assembly 200 and the first lens assembly 300 are spaced apart from each other and are fixedly disposed on the carrying surface 122 of the substrate 120, and the prism assembly 200 is opposite to the light inlet port 1622 of the cover 160. The second slide block 424 of the second lens assembly 400 extends through the mounting slot 1454 to further slide into the slide groove 1452. The third slide block 524 of the third lens assembly 500 extends through the mounting slot 1454 to further slide into the slide groove 1452. In this way, the second slide block 424 and the third slide block 524 are slidably received in the slide groove 1452, such that the second lens assembly 400 and the third lens assembly 500 are slidably connected to the side plate 140. The second slide block 424 is fixedly connected to the second body 422, and the third slide block 524 is fixedly connected to the third body 522. While the second slide block 424 and the third slide block 524 are sliding in the slide groove 1452, the second body 422 drives the second lens group 40 to move, and the third body 522 drives the third lens group 50 to move. In this way, a relative distance between the second lens group 40 and the prism 20 is changed, and a relative distance between the third lens group 50 and the prism 20 is changed. At the same time, a relative distance between the second lens group 40 and the first lens group 30 in the optical axis O and a relative distance between the third lens group 50 and the first lens group 30 in the optical axis O are changed, allowing the camera module 1000 to switch between the long focal length (as shown in FIG. 8) and the short focal length (as shown in FIG. 7).

After the prism assembly 200, the first lens assembly 300, the second lens assembly 400 and the third lens assembly 500 are mounted inside the receiving space 180, the cover 160 is mounted the side plate 140, and the abutting portion 164 of the cover 160 is completely received in the mounting slot 1454. It shall be understood that, while the camera module 1000 is changing the focal length, the second slide block 424 or the third slide block 524 passes over a position of the slide groove 1452 corresponding to the mounting slot 1454, the second slide block 424 or the third slide block 524 do not abut against the inner wall of the slide groove 1452, and the second slide block 424 or the third slide block 524 may shake or tilt in the z-direction. Therefore, after the abutting portion 164 is completely received in the mounting slot 1454, the abutting portion 164 may abut against the second slide block 424 or the third slide block 524, preventing the second slide block 424 or the third slide block 524 from shaking or tilting in the z-direction.

The filter 60 is arranged inside the shell 100 and is disposed between the third lens group 50 and the light sensitive element 600.

The light sensitive element 600 is disposed on the inner surface 141 of the side plate 140 of the shell 100 and is opposite to the prism assembly 200. The light sensitive element 600 is configured to receive a light signal passing through the imaging surface 70 of the optical lens 10 and to convert the light signal into an electrical signal. The light sensitive element 600 may be a Complementary Metal Oxide Semiconductor (CMOS) light sensitive element 600 or a Charge-coupled Device (CCD) light sensitive element 600.

In some embodiments, the camera module 1000 may include a drive structure. For example, the drive structure may be a magnetic drive structure received in the receiving space 180. The magnetic drive structure includes a magnetic coil and a magnet. The magnetic coil may be disposed between the prism assembly 200 and the first lens assembly 300, or between the first lens assembly 300 and the second lens assembly 400, or between the third lens assembly 500 and the light sensitive element 600. The magnet may be disposed on the second body 422 of the second lens assembly 400 and the third body 522 of the third lens assembly 500. In the present embodiment, two magnetic coils are arranged. One of the two magnetic coils is disposed between the prism assembly 200 and the first lens assembly 300, and the other one of the two magnetic coils is disposed between the third lens assembly 500 and the light sensitive element 600. A magnet is disposed on the second body 422 of the second lens assembly 400, and another magnet is disposed on the third body 522 of the third lens assembly 500. When the magnetic coil disposed between the prism assembly 200 and the first lens assembly 300 is conductive, a corresponding magnetic field is generated to control the second body 422 arranged with the magnet to move away from or to approach the corresponding magnetic coil (the second slide block 424 moves along slide groove 1452 away from or close to the corresponding magnetic coil). When the magnetic coil disposed between the third lens assembly 500 and the light sensitive element 600 is conductive, a corresponding magnetic field is generated to control the third body 522 arranged with the magnet to move away from or to approach the corresponding magnetic coil (the third slide block 524 moves along slide groove 1452 away from or close to the corresponding magnetic coil).

In another example, the drive structure may be a linear motor. A stator of a first linear motor may be fixedly mounted on the inner surface 141. A mover of the first linear motor extends from the stator and is connected to the second body 422. A stator of a second linear motor may also be fixedly mounted on the inner surface 141. A mover of the second linear motor extends from the stator and is connected to the third body 522. When the mover of the first linear motor extends and retracts linearly, the second body 422 is driven to move linearly (the second slide block 424 slides in the slide groove 1452). When the mover of the second linear motor extends and retracts linearly, the third body 522 is driven to move linearly (the third slide block 524 slides in the slide groove 1452). The drive structure may also be a structure in other types, such as a hydraulic structure, a piezoelectric motor, and the like, which will not be listed completely in the present disclosure.

In the present disclosure, the camera module 1000 is arranged with the first diaphragm 36 and the second diaphragm 48, and the second diaphragm 48, the second lens group 40 and the third lens group 50 may move relative to the prism 20. In this way, in the long focal length state, the first diaphragm 36 serves as the aperture diaphragm, and the second diaphragm 48 serves as the stray light elimination diaphragm. In the short focal length state, the second diaphragm 48 serves as the aperture diaphragm, and the first diaphragm 36 serves as the stray light elimination diaphragm. In this way, a risk of stray light or vignetting of the optical lens 10 is reduced, and the performance of the optical lens 10 is improved.

Figure 9:
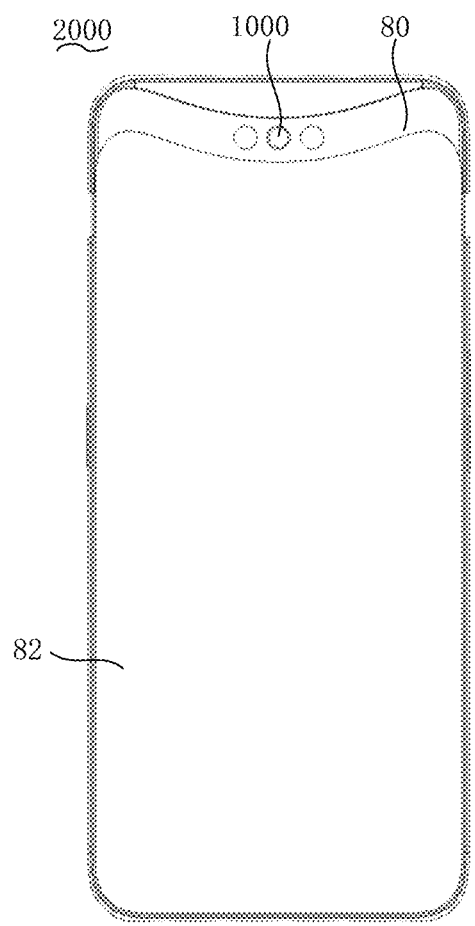
FIG. 9 is a planar schematic view of an image capturing device according to an embodiment of the present disclosure.
Figure 10:
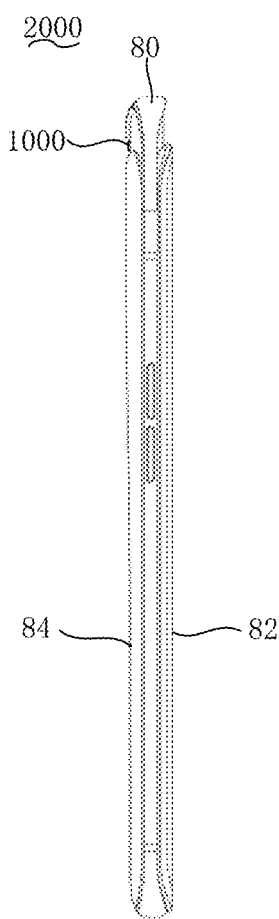
FIG. 10 is a planar schematic view of an image capturing device from another viewing angle according to an embodiment of the present disclosure.

As shown in FIG. 9 and FIG. 10, the present disclosure also provides an image capturing device 2000. The image capturing device 2000 includes the camera module 1000 of any of the above embodiments and a device shell 80. The camera module 1000 is mounted inside the device shell 80.

In detail, the image capturing device 2000 includes a device shell 80 and a camera module 1000. The camera module 1000 is connected to the device shell 80. The image capturing device 2000 may be a mobile phone, a tablet computer, a monitor, a laptop computer, a teller machine, a gate, a smart watch, a head display device, a gaming console, and the like. The present disclosure is illustrated by taking the image capturing device 2000 being a mobile phone as an example. It shall be understood that, a specific form of the image capturing device 2000 is not limited to a mobile phone.

The device shell 80 may be configured for the camera module 1000 to be mounted. In other words, the device shell 80 may serve as a carrier for the camera module 1000. The image capturing device 2000 includes a front 82 and a rear 84. The camera module 1000 may be arranged on the front 82, serving as a front camera. The camera module 1000 may also be arranged on the rear 84, serving as a rear camera. In the present embodiment, the camera module 1000 is arranged on the rear 84, serving as the rear camera. The device shell 80 may further be configured for mounting the camera module 1000, a power supply apparatus, a communication apparatus and other functional modules of the image capturing device 2000, such that the device shell 80 provides protection for the functional modules against dust, dropping, water, and the like.

As shown in FIG. 7 and FIG. 8, in an imaging process, the light passes through the light inlet port 1622 of the cover 160 to reach an inside of the shell 100, and passes through the light inlet through hole 222 of the prism assembly 200 to reach the light inlet surface 22 of the prism 20. The light is reflected by the prism 20, and passes through the light outlet surface 22 of the prims 20 and the light outlet through hole 224 to reach an outside. Further, the light successively passes through the first lens group 30, the second lens group 40, the third lens group 50, and the light filter 60, and at last reaching the light sensitive element 600 for imaging. In the camera module 1000, the relative distance between the second lens group 40 and the first lens group 300 on the optical axis O may be changed by relative movement of the second slide block 424 in the slide groove 1452, and the relative distance between the second lens group 40 and the first lens group 300 on the optical axis O may be changed by relative movement of the second slide block 424 in the slide groove 1452, allowing the image module 1000 to change the focal length.

In the present disclosure, the image capturing device 2000 is arranged with the first diaphragm 36 and the second diaphragm 48, and the second diaphragm 48, the second lens group 40 and the third lens group 50 may move relative to the prism 20. In this way, in the long focal length state, the first diaphragm 36 serves as the aperture diaphragm, and the second diaphragm 48 serves as the stray light elimination diaphragm. In the short focal length state, the second diaphragm 48 serves as the aperture diaphragm, and the first diaphragm 36 serves as the stray light elimination diaphragm. In this way, a risk of stray light or vignetting of the optical lens 10 is reduced, and the performance of the optical lens 10 is improved.

In the description of the present specification, terms "certain embodiments", "an embodiment", "some embodiments", "exemplary embodiments", "examples", "specific examples", or "some examples" means that specific features, structures, materials or properties described are included in at least one embodiments or examples in the present disclosure. In the present specification, the exemplary expressions of the above terms do not necessarily refer to one same embodiment or example. Further, specific features, specific structures, specific materials or specific properties described may be combined with any one or more of the embodiments or examples in a suitable manner.

Terms "first" and "second" are used for descriptive purposes only and shall not be understood as indicating or implying relative importance or as implicitly specifying the number of technical features indicated. Therefore, the features defined by the "first" and the "second" may explicitly or implicitly include at least one of the described features. In the description of the present disclosure, "a plurality of" means at least two, such as two, three, unless otherwise expressively and specifically limited.

Although embodiments of the present disclosure are shown and described above. It shall be understood that the above embodiments are exemplary and shall not be interpreted as limiting the scope of the present disclosure. An ordinary skilled person in the art can make variations, modifications, replacements and variants for the above embodiments within the scope of the present disclosure. The scope of the present disclosure is defined by the claims and their equivalents.

What is claimed is:

1. An optical lens, comprising:
   a prism, a first lens group, a second lens group, and a third lens group, that are successively arranged along a direction from an object side to an imaging side;
   wherein the prism is fixed relative to an imaging surface of the optical lens;
   wherein a first diaphragm is disposed between the first lens group and the prism;
   wherein a second diaphragm is disposed between the second lens group and the third lens group or between the first lens group and the second lens group;
   wherein when the optical lens is switched between a short focal length state and a long focal length state, the prism is fixed, the first lens group and the first diaphragm are fixed relative to the prism, and the second lens group, the third lens group and the second diaphragm move along an optical axis of the optical lens relative to the prism;
   wherein in the long focal length state, the first diaphragm serves as an aperture diaphragm and the second diaphragm serves as a stray light elimination diaphragm;
   wherein in the short focal length state, the second diaphragm serves the aperture diaphragm, and the first diaphragm serves as the stray light elimination diaphragm;
   wherein the first lens group comprises a first lens and a second lens that are fixed relative to each other;
   wherein the second lens group comprises a third lens, a fourth lens, and a fifth lens that are arranged successively and fixed relative to each other; and
   wherein the third lens group comprises a sixth lens and a seventh lens that are fixed relative to each other.

2. The optical lens according to claim 1, wherein:
   the first diaphragm is disposed on an object side of the first lens; and
   the second diaphragm is disposed on an object side of the third lens and is capable of moving along with the second lens group, when the second diaphragm is disposed between the first lens group and the second lens group.

3. The optical lens according to claim 1, wherein:
   the first diaphragm is disposed on an object side of the first lens; and
   the second diaphragm is disposed on an object side of the sixth lens and is capable of moving along with the third lens group, when the second diaphragm is disposed between the second lens group and the third lens group.

4. The optical lens according to claim 2, wherein:
   a physical aperture size of the first diaphragm is D1, a physical aperture size of the second diaphragm is D2;

when the optical lens is in the long focal length state, a light beam aperture size at a location where the first diaphragm is disposed is A1, and a light beam aperture size at a location where the second diaphragm is disposed is A2, D1=A1, and D2>A2; and when the optical lens is in the short focal length state, a light beam aperture size at a location where the first diaphragm is disposed is B1, and a light beam aperture size at a location where the second diaphragm is disposed is B2, D2=B2, and D1>B1.

5. The optical lens according to claim 1, wherein each of the first lens, the second lens, the third lens, the fourth lens, the fifth lens, the sixth lens, and the seventh lens is a non-spherical lens.

6. The optical lens according to claim 1, wherein at least one of the first lens, the second lens, the third lens, the fourth lens, the fifth lens, the sixth lens, and the seventh lens is arranged with a transmission-enhancing film.

7. The optical lens according to claim 1, wherein when the second diaphragm is disposed between the first lens group and the second lens group, when the optical lens is switched from the long focal length state to the short focal length state, the third lens group moves from the imaging side to the object side in a direction of the optical axis, and the second lens group and the second diaphragm move from the object side to the imaging side in the direction of the optical axis; and when the optical lens is switched from the short focal length state to the long focal length state, the third lens group moves from the object side to the imaging side in the direction of the optical axis, and the second lens group and the second diaphragm move from the imaging side to the object side in the direction of the optical axis.

8. The optical lens according to claim 1, wherein:

when the optical lens is in the long focal length state, a focal length f=23 mm, F/#=4.4 and a field of view is 20 degrees; and when the optical lens is in the short focal length state, a focal length f=14 mm, F/#=3.2 and a field of view is 30.5 degrees.

9. A camera module, comprising:

an optical lens; and a light sensitive element disposed on an imaging side of the optical lens, wherein the light sensitive element is configured receive a light signal passing through the optical lens and to convert the light signal into an electrical signal, wherein the optical lens comprises: a prism, a first lens group, a second lens group, and a third lens group, that are successively arranged along a direction from an object side to the imaging side;

wherein the prism is fixed relative to an imaging surface of the optical lens;

wherein a first diaphragm is disposed between the first lens group and the prism;

wherein a second diaphragm is disposed between the second lens group and the third lens group or between the first lens group and the second lens group;

wherein when the optical lens is switched between a short focal length state and a long focal length state, the prism is fixed, the first lens group and the first diaphragm are fixed relative to the prism, and the second lens group, the third lens group and the second diaphragm move along an optical axis of the optical lens relative to the prism;

wherein in the long focal length state, the first diaphragm serves as an aperture diaphragm and the second diaphragm serves as a stray light elimination diaphragm;

wherein in the short focal length state, the second diaphragm serves the aperture diaphragm, and the first diaphragm serves as the stray light elimination diaphragm;

wherein the first lens group comprises a first lens and a second lens that are fixed relative to each other;

wherein the second lens group comprises a third lens, a fourth lens, and a fifth lens that are arranged successively and fixed relative to each other; and wherein the third lens group comprises a sixth lens and a seventh lens that are fixed relative to each other.

10. The camera module according to claim 9, wherein:

the camera module comprises a shell, a prism assembly, a first lens assembly, a second lens assembly and a third lens assembly;

the prism is arranged in the prism assembly, the first lens group is arranged in the first lens assembly, the second lens group is arranged in the second lens assembly, and the third lens group is arranged in the third lens assembly;

the prism assembly and the first lens assembly are spaced apart from each other and are fixedly arranged in the shell; and the second lens assembly and the third lens assembly are slidably arranged in said shell and are movable relative to the first lens assembly.

11. The camera module according to claim 10, wherein:

the shell comprises a substrate, a side plate and a cover;

the substrate, the side plate and the cover cooperatively define a receiving space; and the first lens assembly is received in the receiving space, the first lens assembly comprises a first shell, the first lens group and the first diaphragm are arranged inside the first shell.

12. The camera module according to claim 11, wherein:

the second lens assembly is received in the receiving space;

the second lens assembly comprises a second shell, the second lens group and the second diaphragm are arranged on the second shell;

the second diaphragm and the second lens group move along with the second shell when the second shell is moving.

13. The camera module according to claim 11, wherein:

the side plate comprises a first side plate and a second side plate opposite to the first side plate;

at least one of an inner surface of the first side plate and an inner face of the second side plate defines a slide groove and a mounting slot;

the slide groove and the mounting slot are communicated with the receiving space, and an extending direction of the mounting slot is perpendicular to or inclined to an extending direction of the slide groove.

14. The camera module according to claim 13, wherein the second shell comprises a second body and a second slide block, the second slide block is capable of extending through the mounting slot to be received into the slide groove, and the second slide block is slidable in the slide groove.

15. The camera module according to claim 12, wherein:

the third lens assembly is received in the receiving space, the third lens assembly comprises a third shell; and when the third shell slides, the third shell drives the third lens group to slide.

16. The camera module according to claim 13, wherein the third shell comprises a third body and a third slide block, the third slide block is capable of extending through the mounting slot to be received into the slide groove, and the third slide block is slidable in the slide groove.

17. The camera module according to claim 12, wherein the camera module comprises a drive structure, received in the receiving space.

18. The camera module according to claim 17, wherein the drive structure comprises a magnetic drive structure, a linear motor, a hydraulic structure or a piezoelectric motor.

19. An imaging capturing device, comprising:
a camera module; and
a device shell,
wherein the camera module is arranged on the device shell and comprises: an optical lens; and a light sensitive element disposed on an imaging side of the optical lens, wherein the light sensitive element is configured receive a light signal passing through the optical lens and to convert the light signal into an electrical signal,
wherein the optical lens comprises: a prism, a first lens group, a second lens group, and a third lens group, that are successively arranged along a direction from an object side to the imaging side; wherein,
the prism is fixed relative to an imaging surface of the optical lens;
a first diaphragm is disposed between the first lens group and the prism;
a second diaphragm is disposed between the second lens group and the third lens group or between the first lens group and the second lens group;
when the optical lens is switched between a short focal length state and a long focal length state, the prism is fixed, the first lens group and the first diaphragm are fixed relative to the prism, and the second lens group, the third lens group and the second diaphragm move along an optical axis of the optical lens relative to the prism;
in the long focal length state, the first diaphragm serves as an aperture diaphragm and the second diaphragm serves as a stray light elimination diaphragm; and
in the short focal length state, the second diaphragm serves the aperture diaphragm, and the first diaphragm serves as the stray light elimination diaphragm.

* * * * *